US009571337B1

(12) United States Patent
Xu et al.

(10) Patent No.: US 9,571,337 B1
(45) Date of Patent: Feb. 14, 2017

(54) DERIVING CONTROL PLANE CONNECTIVITY DURING PROVISIONING OF A DISTRIBUTED CONTROL PLANE OF A SWITCH

(75) Inventors: Xiangwen Xu, Saratoga, CA (US); Quaizar Vohra, Santa Clara, CA (US); Prabhu Seshachellam, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 251 days.

(21) Appl. No.: 12/976,075

(22) Filed: Dec. 22, 2010

(51) Int. Cl.
*H04L 12/24* (2006.01)

(52) U.S. Cl.
CPC ............... *H04L 41/08* (2013.01); *H04L 41/00* (2013.01); *H04L 41/082* (2013.01); *H04L 41/0803* (2013.01); *H04L 41/0806* (2013.01); *H04L 41/0813* (2013.01); *H04L 41/0816* (2013.01); *H04L 41/0893* (2013.01); *H04L 41/12* (2013.01)

(58) Field of Classification Search
None
See application file for complete search history.

(56) References Cited

U.S. PATENT DOCUMENTS

| | | | |
|---|---|---|---|
| 5,796,736 A * | 8/1998 | Suzuki | 370/254 |
| 5,892,912 A * | 4/1999 | Suzuki et al. | 370/395.53 |
| 6,085,238 A * | 7/2000 | Yuasa et al. | 709/223 |
| 6,286,038 B1 * | 9/2001 | Reichmeyer et al. | 709/220 |
| 7,079,544 B2 * | 7/2006 | Wakayama et al. | 370/401 |
| 7,088,677 B1 * | 8/2006 | Burst, Jr. | 370/229 |
| 7,633,954 B2 * | 12/2009 | Wakayama et al. | 370/401 |
| 8,274,912 B2 * | 9/2012 | Wray et al. | 370/254 |
| 2003/0051195 A1 * | 3/2003 | Bosa et al. | 714/43 |
| 2004/0001485 A1 * | 1/2004 | Frick et al. | 370/389 |
| 2004/0066780 A1 * | 4/2004 | Shankar | H04L 12/4645 370/389 |
| 2004/0066781 A1 * | 4/2004 | Shankar | H04L 12/4666 370/389 |
| 2004/0151120 A1 * | 8/2004 | Shankar | H04L 49/90 370/249 |
| 2006/0184998 A1 * | 8/2006 | Smith et al. | 726/3 |
| 2006/0236095 A1 * | 10/2006 | Smith et al. | 713/153 |
| 2007/0280243 A1 * | 12/2007 | Wray et al. | 370/392 |
| 2008/0310421 A1 * | 12/2008 | Teisberg et al. | 370/395.53 |
| 2009/0129385 A1 * | 5/2009 | Wray et al. | 370/392 |
| 2009/0276774 A1 * | 11/2009 | Kinoshita | 718/1 |
| 2010/0100611 A1 * | 4/2010 | Hatasaki et al. | 709/221 |
| 2010/0165876 A1 * | 7/2010 | Shukla et al. | 370/254 |
| 2010/0165877 A1 * | 7/2010 | Shukla et al. | 370/254 |
| 2010/0169467 A1 * | 7/2010 | Shukla et al. | 709/220 |
| 2010/0223397 A1 * | 9/2010 | Elzur | 709/235 |
| 2013/0219052 A1 * | 8/2013 | Prakash et al. | 709/224 |

* cited by examiner

*Primary Examiner* — Ayaz Sheikh
*Assistant Examiner* — Peter Chau
(74) *Attorney, Agent, or Firm* — Cooley LLP (57) ABSTRACT

System and methods for deriving configuration information of network resources within a dynamically configured, distributed control plane are described. In one embodiment, the present invention can include a network management device that manages virtual network entities, such as virtual switch fabrics, where the network management device hosts a network management module. The network management module is configured to maintain identifiers for the virtual network entities and the control plane connectivity data of the network devices hosting the virtual network entities.

16 Claims, 6 Drawing Sheets

Configuration File 600

| NCE 610 | Group of Ports 620 | Device IP Addr 630 | Port 640 | Port MAC Addr 650 |
|---|---|---|---|---|
| 193 | 183 | aaa.aa.aaa.a | 121 | aa aa aa aa aa aa |
| 193 | 183 | aaa.aa.aaa.a | 122 | bb bb bb bb bb bb |
| 193 | 183 | aaa.aa.aaa.a | 123 | cc cc cc cc cc cc |
| 193 | 183 | aaa.aa.aaa.a | 124 | dd dd dd dd dd dd |

FIG. 6

Configuration File 700

| NCE 710 | Group of Ports 720 | Device IP Addr 730 | Port 740 | Port MAC Addr 750 |
|---|---|---|---|---|
| 193 | 183 | aaa.aa.aaa.a | 121 | aa aa aa aa aa aa |
| 193 | 183 | aaa.aa.aaa.a | 122 | bb bb bb bb bb bb |
| 193 | 183 | aaa.aa.aaa.a | 123 | cc cc cc cc cc cc |
| 193 | 183 | aaa.aa.aaa.a | 124 | dd dd dd dd dd dd |
| 193 | 183 | bbb.bb.bbb.b | 131 | ee ee ee ee ee ee |
| 193 | 183 | bbb.bb.bbb.b | 132 | ff ff ff ff ff ff |

DERIVING CONTROL PLANE CONNECTIVITY DURING PROVISIONING OF A DISTRIBUTED CONTROL PLANE OF A SWITCH

BACKGROUND

Some embodiments described herein relate generally to resource management, and, in particular, to deriving control plane connectivity data of network devices within a distributed control plane of a switch.

Some known networking systems include a centralized control plane that can manage resources connected to the networking system. For example, the centralized control plane can maintain a database associated with the physical location of the resources. Additionally, the centralized control plane can manage forwarding-state information associated with the resources. Such a centralized control plane, however, can become extremely large and unmanageable when a large number of resources are connected to the networking system.

Other known networking systems include a distributed control plane. Such known distributed control planes can be implemented at various nodes within the networking system. Such known distributed control planes, however, are not dynamically configured. As such, some nodes within the networking system can be largely under-utilized while other nodes within the networking system can be over-utilized. Accordingly, such networking systems do not operate as efficiently as desired.

Accordingly, a need exists for a networking system that can maintain control plane connectivity data of network devices for a dynamically configured distributed control plane.

SUMMARY

A system and method for deriving configuration information of network resources within a dynamically-configured distributed control plane is described. In one embodiment, a network management device can manage virtual network entities, such as virtual switch fabrics, and can host a network management module. The network management module is configured to maintain identifiers for the virtual network entities and the control plane connectivity data of the network devices hosting the virtual network entities.

DETAILED DESCRIPTION

In some embodiments, a switch fabric system includes a switch fabric and multiple network devices operatively coupled to the switch fabric. The multiple network devices include multiple ports each to be operatively coupled to a peripheral processing device. A first set of ports from the multiple ports is managed by a first network control entity. The second set of ports is managed by a second network control entity. The network control plane connectivity data, identifiers for the multiple network devices, identifiers for the first set of ports, identifiers for the second set of ports, and identifiers for the first and second network control entities are maintained by a network management module such that the network management module can derive network control plane connectivity data from the identifiers.

In some embodiments, a portion of the network control plane connectivity data, identifiers for the multiple network devices, identifiers for the first set of ports, and identifiers for the first virtual network entity are maintained by the first network control entity such that the first network management module can derive network control plane connectivity data from the identifiers.

In some embodiments, network management modules can send control plane signals to command a network control entity to derive control plane connectivity data and to respond to the network management module with the network control plane connectivity data. In other embodiments, a first network control entity can send a similar control plane signal to a second network control entity.

Embodiments shown and described herein refer to multiple communication layers (e.g., data link layer (layer-2), network layer (layer-3), physical layer (layer-1), application layer (layer-7), etc.). Such communication layers can be defined by the open systems interconnection (OSI) model. Accordingly, the physical layer can be a lower level layer than the data link layer. Additionally, the data link layer can be a lower level layer than the network layer and the application layer. Further, different protocols can be associated with and/or implemented at different layers within the OSI model. For example, an Ethernet protocol, a Fibre Channel protocol and/or a cell based protocol (e.g., used within a data plane portion of a communications network) can be associated with and/or implemented at a data link layer while a Border Gateway Protocol (BGP) can be associated with and/or implemented at a higher layer, such as, for example, an application layer. While a BGP can be implemented at the application layer, it can be used to send forwarding-state information (e.g., port identifiers, network segment identifiers, peripheral processing device identifiers, etc.) used to populate a routing table associated with a network layer.

As used herein, the term "physical hop" can include a physical link between two modules and/or devices. For example, a data path operatively coupling a first module with a second module can be said to be a physical hop. Similarly stated, a physical hop can physically link the first module with the second module.

As used herein, the term "single physical hop" can include a direct physical connection between two modules and/or devices in a system. Similarly stated, a single physical hop can include a link via which two modules are coupled without intermediate modules. Accordingly, for example, if a first module is coupled to a second module via a single physical hop, the first module can send data packets directly to the second module without sending the data packets through intervening modules.

As used herein, the term "single logical hop" means a physical hop and/or group of physical hops that are a single hop within a network topology associated with a first protocol (e.g., a first data link layer protocol). Similarly stated, according to the topology associated with the first protocol, no intervening nodes exist between a first module and/or device operatively coupled to a second module and/or device via the physical hop and/or the group of physical hops. A first module and/or device connected to a second module and/or device via a single logical hop can send a data packet to the second module and/or device using a destination address associated with the first protocol and the second module and/or device, regardless of the number of physical hops between the first device and the second device. In some embodiments, for example, a second protocol (e.g., a second data link layer protocol) can use the destination address of the first protocol (e.g., the first data link layer protocol) to route a data packet and/or cell from the first module and/or device to the second module and/or device over the single logical hop. Similarly stated, when a first module and/or device sends data to a second module and/or device via a single logical hop of a first protocol, the first module and/or device treats the single logical hop as if it is sending the data directly to the second module and/or device.

In some embodiments, a switch fabric can function as part of a single logical hop (e.g., a single large-scale consolidated layer-2 (L2)/layer-3 (L3) switch). Portions of the switch fabric can be physically distributed across, for example, many chassis and/or modules interconnected by multiple physical hops. In some embodiments, for example, a processing stage of the switch fabric can be included in a first chassis and another processing stage of the switch fabric can be included in a second chassis. Both of the processing stages can logically function as part of a single consolidated switch (e.g., within the same logical hop according to a first protocol) but include a separate single physical hop between respective pairs of processing stages. Similarly stated, each stage within a switch fabric can be adjacent stage(s) by physical links while operating collectively as a single logical hop associated with a protocol used to route data outside the switch fabric. Additionally, packet classification and forwarding associated with a protocol (e.g., Ethernet) used to route data outside a single logical hop need not occur at each stage within the single logical hop. In some embodiments, for example, packet classification and forwarding associated with a first protocol (e.g., Ethernet) can occur prior to a module and/or device sending the data packet to another module and/or device via the single logical hop.

As used in this specification, the singular forms "a," "an" and "the" include plural referents unless the context clearly dictates otherwise. Thus, for example, the term "a module" is intended to mean a single module or a combination of modules.

Figure 1:
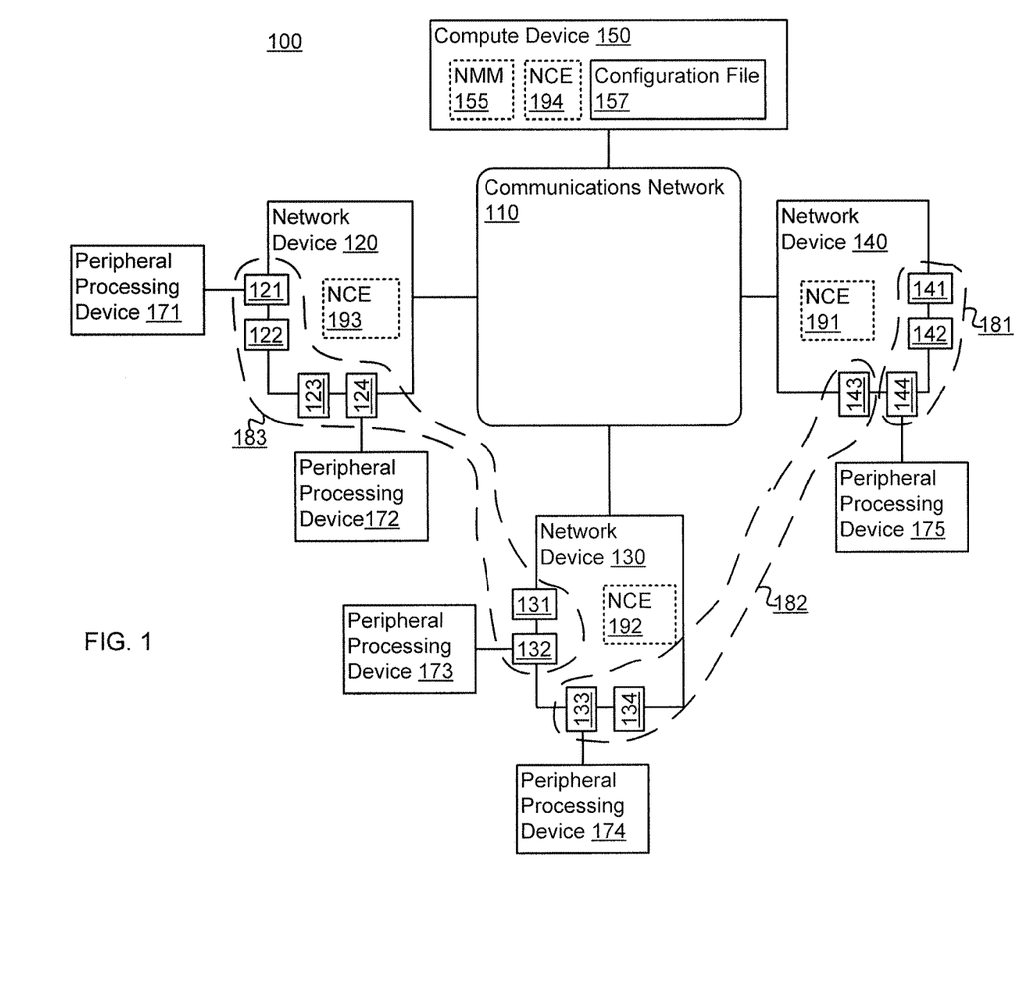
FIG. 1 is a schematic illustration of a switch fabric system, according to an embodiment.

FIG. 1 is a schematic diagram that illustrates a switch fabric system 100, according to an embodiment. The switch fabric system 100 includes a communications network 110, multiple network devices 120, 130, 140, a compute device 150, and multiple peripheral processing devices 171-175. The peripheral processing devices 171-175 are operatively coupled to each other by remaining portions of the switch fabric system 100. The peripheral processing devices 171-175 can be, for example, compute nodes, service nodes, routers, and storage nodes, as described in further detail herein. In some embodiments, for example, the peripheral processing devices 171-175 include servers, storage devices, gateways, workstations, and/or the like.

The peripheral processing devices 171-175 can be operatively coupled to one or more ports 121-124, 131-134, 141-144 of the network devices 120, 130, 140 using any suitable connection such as, for example, an optical connection (e.g., an optical cable and optical connectors), an electrical connection (e.g., an electrical cable and electrical connectors) and/or the like. Similarly stated, each port 121-124, 131-134, 141-144 provides a communication interface through which a peripheral processing device 171-175 can be operatively coupled to a network device 120, 130, 140, as described in further detail herein. As such, the peripheral processing devices 171-175 can send data (e.g., data packets, data cells, etc.) to and receive data from the network devices 120, 130, 140. In some embodiments, the connection between the peripheral processing devices 171-175 and the network devices 120, 130, 140 is a direct link. Such a link can be said to be a single physical hop link. In other embodiments, the peripheral processing devices 171-175 can be operatively coupled to the network devices 120, 130, 140 via intermediate modules. Such a connection can be said to be a multiple physical hop link.

Each network device 120, 130, 140 can be any device that operatively couples peripheral processing devices 171-175 to the communications network 110. In some embodiments, for example, the network devices 120, 130, 140 can be edge devices, input/output modules, top-of-rack devices and/or the like. Structurally, the network devices 120, 130, 140 can function as both source network device and destination network device. Accordingly, the network device 120, 130, 140 can send data (e.g., a data stream of data packets and/or data cells) to and receive data from the communications network 110, and to and from the connected peripheral processing devices 171-175.

Each of the network devices 120, 130, 140 is operable to communicate with the other network devices 120, 130, 140 via the communications network 110 (e.g., within both a control plane portion and data plane portion). Specifically, the data plane portion of the communications network 110 provides any-to-any connectivity between the network devices 120, 130, 140 at relatively low latency. For example, the data plane portion of the communications network 110 can transmit (e.g., convey) data between network devices 120, 130, 140. In some embodiments, the communications network 110 can have at least hundreds or thousands of ports (e.g., egress ports and/or ingress ports) through which network device 120, 130, 140 can transmit and/or receive data.

Referring still to FIG. 1, the communications network 110 can be any suitable communications network that operatively couples the network devices 120, 130, 140 to the other network devices 120, 130, 140. Additionally, the communications network 110 can operatively couple the compute device 150 to the network devices 120, 130, 140. In some embodiments, the communications network 110 includes a data plane portion and a control plane portion. The control plane portion of the communications network 110 facilitates transmission of control signals (e.g., configuration information, forwarding-state information, etc.) between the network control entities 191-194 and the network management module 155. Accordingly, the network control entities 191-194 can send control plane signals, for example configuration information and/or forwarding-state information, to other network control entities 191-194 via the control plane portion of the communications network 110. In some embodiments, the control plane portion of the communications network 110 includes direct links between the network control entity 194 and the network control entities 191-193.

The data plane portion of the communications network 110 facilitates transmission of data between network devices 120, 130, 140. In some embodiments, the data plane portion of the communications network 110 is a switch fabric having one or more stages. For example, the data plane portion of the communications network 110 can be a Clos switch fabric network (e.g., a non-blocking Clos network, a strict sense non-blocking Clos network, a Benes network) having multiple stages of switching modules (e.g., integrated Ethernet switches). Such a switch fabric can include any number of stages. In some embodiments, for example, the switch fabric can include five, seven or nine stages. The data plane portion of the communications network 110 can be, for example, part of a core portion of a data center similar to the core portion of the data center described in co-pending U.S. patent application Ser. No. 12/495,337, filed Jun. 30, 2009, and entitled "Methods and Apparatus Related to Any-to-Any Connectivity Within a Data Center," which is incorporated herein by reference in its entirety.

In some embodiments, the data plane portion of the communications network 110 can be (e.g., can function as) a single consolidated switch (e.g., a single large-scale consolidated L2/L3 switch). In other words, the data plane portion of the communications network 110 can operate as a single logical entity (e.g., a single logical network element). Similarly stated, the data plane portion of the communications network 110 can be part of a single logical hop between a first network device 120, 130, 140 and a second network device 120, 130, 140 (e.g., along with the data paths between the network devices 120, 130, 140 and the communications network 110). The data plane portion of the communications network 110 can couple (e.g., indirectly connect, facilitate communication between) the peripheral processing devices 171-175. In some embodiments, the communications network 110 can communicate via interface devices (not shown) operable to transmit data at a rate of at least 10 Gb/s. In some embodiments, the communications network 110 can communicate via interface devices (e.g., Fibre-Channel interface devices) operable to transmit data at a rate of, for example, 2 Gb/s, 4, Gb/s, 8 Gb/s, 10 Gb/s, 40 Gb/s, 100 Gb/s and/or faster link speeds.

Although the data plane portion of the communications network 110 can be logically centralized, the implementation of the data plane portion of the communications network 110 can be highly distributed, for example, for reliability. For example, portions of the data plane portion of the communications network 110 can be physically distributed across, for example, many chassis. In some embodiments, for example, a processing stage of the data plane portion of the communications network 110 can be included in a first chassis and another processing stage of the data plane portion of the communications network 110 can be included in a second chassis. Both of the processing stages can logically function as part of a single consolidated switch (e.g., within the same logical hop) but have a separate single physical hop between respective pairs of processing stages.

In use, the network management module 155 initiates network control entities 191-193 (by sending a signal to the network devices 120, 130, 140 via the control plane portion of the communications network 110, respectively) and, based on a processing capacity of the network control entities 191-193, assigns each port 121-124, 131-134, 141-144 to a network control entity 191-193. As shown in FIG. 1, for example, the network management module 155 associates ports 121-124, 131 and 132 (group of ports 183) with the network control entity 193; ports 133, 134 and 143 (group of ports 182) with the network control entity 192; and ports 141, 142 and 144 (group of ports 183) with the network control entity 191.

Figure 2:
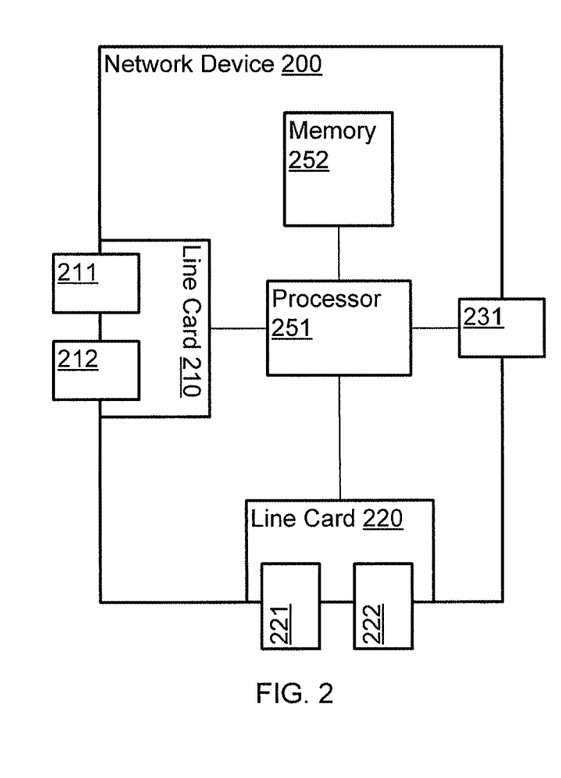
FIG. 2 is a schematic illustration of a network device of a switch fabric system, according to another embodiment.

FIG. 2 is a system block diagram of a network device 200 similar to the network devices 120, 130, 140. The network device 200 includes processor 251, memory 252, line card 210, line card 220, and port 231. Processor 251 is operatively coupled to memory 252, line card 210, line card 220 and port 231. Line card 210 includes ports 211 and 212. Line card 220 includes ports 221 and 222. In some embodiments, line cards 210 and/or 220 include one or more processors and/or memories.

Although the processor 251 is operatively coupled to memory 252, line card 210, line card 220 and port 231, signals (packets, cells, or data) can be sent and/or received by and within network device 200 differently for the data plane and for the control plane. For example, when a packet within the data plane is received at port 211, the packet can be forwarded to port 231 without passing through processor 251. For another example, when a signal within the control plane is received by network device 200, the signal can be processed and/or modified by processor 251, which can in turn send another signal (or a modified version of the signal) to memory 252, line card 210, line card 220, and/or port 231 within the data plane.

Similar to the ports 121-124, 131-134, 141-144 of the network devices 120, 130, 140 shown in FIG. 1, ports 211, 212, 221 and 222 can communicate with peripheral processing devices. For example, ports 211, 212, 221 and 222 can implement a physical layer using twisted-pair electrical signaling via electrical cables or fiber-optic signaling via fiber-optic cables. In some embodiments, some of ports 211, 212, 221 and 222 implement one physical layer such as twisted-pair electrical signaling and others of ports 211, 212, 221 and 222 implement a different physical layer such as fiber-optic signaling. Furthermore, ports 211, 212, 221 and 222 can allow network device 200 to communicate with peripheral processing devices, such as, for example, computer servers (servers), via a common protocol such as Ethernet or Fibre Channel. In some embodiments, some of ports 211, 212, 221 and 222 implement one protocol such as Ethernet and others of ports 211, 212, 221 and 222 implement a different protocol such as Fibre Channel. Thus, network device 200 can be in communication with multiple peripheral processing devices using homogeneous or heterogeneous physical layers and/or protocols via ports 211, 212, 221 and 222.

Port 231 can be in communication with other network devices via a communications network such as a switch fabric (e.g., data plane portion of communications network 110). Port 231 can be part of one or more network interfaces (e.g., a 40 Gigabit (Gb) Ethernet interface, a 100 Gb Ethernet interface, etc.) through which the network device 200 can send signals to and/or receive signals from a communications network. The signals can be sent to and/or received from the communications network via an electrical link, an optical link and/or a wireless link operatively coupled to the network device 200. In some embodiments, the network device 200 can send signals to and/or receive signals from the communications network based on one or more protocols (e.g., an Ethernet protocol, a multi-protocol label switching (MPLS) protocol, a Fibre Channel protocol, a Fibre-Channel-over Ethernet protocol, an Infiniband-related protocol).

In some embodiments, port 231 can implement a different physical layer and/or protocol than those implemented at ports 211, 212, 221 and 222. For example, port 211, 212, 221 and 222 can communicate with peripheral processing devices using a protocol based on data packets and port 231 can communicate via a switch fabric using a protocol based on data cells. Said differently, network device 200 can be an edge device of a network switch such as a distributed network switch.

In some embodiments, the network device 200 can prepare a data packet (e.g., an Ethernet packet) to enter a communications network (e.g., communications network 110). For example, the network device 200 can forward, classify, and/or modify the packet encapsulation (e.g., modify, add and/or remove a header portion, footer portion and/or any other identifier included within the data packet) of a data packet prior to sending the data packet to the communications network. Additional details related to packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Returning to FIG. 1, and as described in further detail herein, the network devices 120, 130, 140 can host network control entities 191-193 to manage the ports 121-124, 131-134, 141-144 of the network devices 120, 130, 140. Accordingly, the network control entities 191-193 can be part of a control plane of the switch fabric system 100. Each network control entity 191-193 can be a process, application, virtual machine, and/or some other software module (executing in hardware) or a hardware module executed at a network device 120, 130, 140 or a compute device 150. As such, instructions that implement the network control entities 191-193 can be stored within a memory of a network device 120, 130, 140 (e.g., memory 252) and executed at a processor of a network device 120, 130, 140 (e.g., processor 251).

In some embodiments, network control entities 191-193 can be assigned connectivity information. Such connectivity information can be an address identifier for use by a communications protocol implemented within switch fabric system 100. For example, network control entities 191-193 can be assigned IP addresses that identify network control entities 191-193 within the switch fabric system 100 which implements Ethernet, Fibre Channel, or some other IP-based communications protocol. Network devices 120, 130, 140 can likewise be assigned IP addresses in the same way. Network devices 120, 130, 140 can also be assigned other address identifiers. For example, network devices 120, 130, 140 can be assigned MAC addresses that further identify network devices 120, 130, 140 within the switch fabric system 100. In some embodiments, ports 121-124, 131-134, 141-144 can be assigned IP addresses and/or MAC addresses in the same way. In other embodiments, network devices 120, 130, 140 and/or ports 121-124, 131-134, 141-144 can be assigned other types of address identifiers. For example, network devices 120, 130, 140 may implement a Fibre Channel network. Accordingly, network devices 120, 130, 140 can be assigned a World Wide Name (WWN). The particular types of address identifiers assigned to network devices 120, 130, 140 and ports 121-124, 131-134, 141-144 can depend on the types of communications protocols or networks implemented in switch fabric system 100.

Each network control entity 191-193 can manage ports 121-124, 131-134, 141-144 of the network devices 120, 130, 140. For example, network control entity 191 is operable to manage the ports 141, 142, 144 associated with the group of ports 181; network control entity 192 is operable to manage the ports 133, 134, 143 associated with the group of ports 182; and network control entity 193 is operable to manage the ports 121, 122, 123, 124, 131, 132 associated with the group of ports 183. In some embodiments, each network control entity 191-193 can manage and/or maintain configuration information (e.g., port protocol information, network segment assignment information, port assignment information, peripheral processing device information, etc.) and/or forwarding-state information (e.g., port identifiers, network segment identifiers, peripheral processing device identifiers, etc.) associated with its group of ports 181, 182, 183. In other embodiments, network management module 155 can manage and/or maintain configuration information and/or forwarding-state information.

Each group of ports 181-183 can be a virtual network entity. In some embodiments, a virtual network entity can be a group of network devices. For example, network devices 120 and 130 can be provisioned to a virtual network entity. In other embodiments, a single network device, a portion of a network device, or portions of multiple network devices can be provisioned to a virtual network entity. In still other embodiments, one or more ports of a network device can be provisioned to a virtual network entity.

In some embodiments, a network control entity can control and/or manage ports at a network device at which the network control entity is located (e.g., network control entity 191 manages the group of ports 181). In other embodiments, a network control entity can also control and/or manage ports at a network device other than the network device at which the network control entity is located (e.g., network control entity 193 manages ports 131 and 132, and network control entity 192 manages port 143).

The compute device 150 can host management modules, processes and/or functions associated with the switch fabric system 100. As shown in FIG. 1, the compute device 150 can host a network management module 155. The network management module 155 can be part of the control plane of the switch fabric system 100. Network management module 155 can be a process, application, virtual machine, and/or some other software module (executing in hardware) or a hardware module executed at the compute device 150.

In some embodiments, network management module 155 can send a configuration signal through the control plane of communications network 110 to one of the network control entities 191-193. The configuration signal can be a command to a network control entity to provision another port to a group of ports the network control entity controls and/or manages (e.g., control signal to network control entity 191 to add another port to the group of ports 181). Other types of control plane signals can also be sent. In some embodiments, network management module 155 can manage a configuration file. Such a configuration file can store and/or maintain control plane connectivity information. Such control plane connectivity information can include identifier information for network devices, ports, and network control entities. For example, a configuration file can contain address information for the network control entity 193, network device 120, and/or ports 121-123. In some embodiments, a configuration file can store address identifiers for network control entity 193, network device 120, and/or ports 121-123, 131-132 along with identifiers for the group of ports 183. Accordingly, network management module 155 can send a control plane signal to network device 120 by using an identifier for network control entity 193 or for the group of ports 183. Similarly, network management module 155 can send a control plane signal to one of ports 121-124 by using an identifier for network control entity 193 or for the group of ports 183. An identifier for the group of ports can be an identifier for the group and/or information identifying the ports and/or the network device represented in the group of ports. For example, network management module 155 can retrieve the IP address and MAC address of port 121 from a configuration file by using an identifier for network control entity 193 and/or identifiers for the group of ports 183, and then send a control plane signal to network control entity 193 by sending the control place signal to the IP address and MAC address. Similarly, network management module 155 can retrieve the IP address of network device 120 from a configuration file by using an identifier for network control entity 193, an identifier for the group of ports 183, and then send a control plane signal to network control entity 193 by sending the control plane signal to network control entity 193 by sending the control plane signal to the IP address.

In other embodiments, network control entity 193 can manage a configuration file. Such a configuration file can be stored at network device 120 or at some other network device having storage capabilities. In such embodiments, network management module 155 can send a control plane signal to command network control entity 193 to respond with control plane connectivity data for network device 120 or one of ports 121-124.

Figure 3:
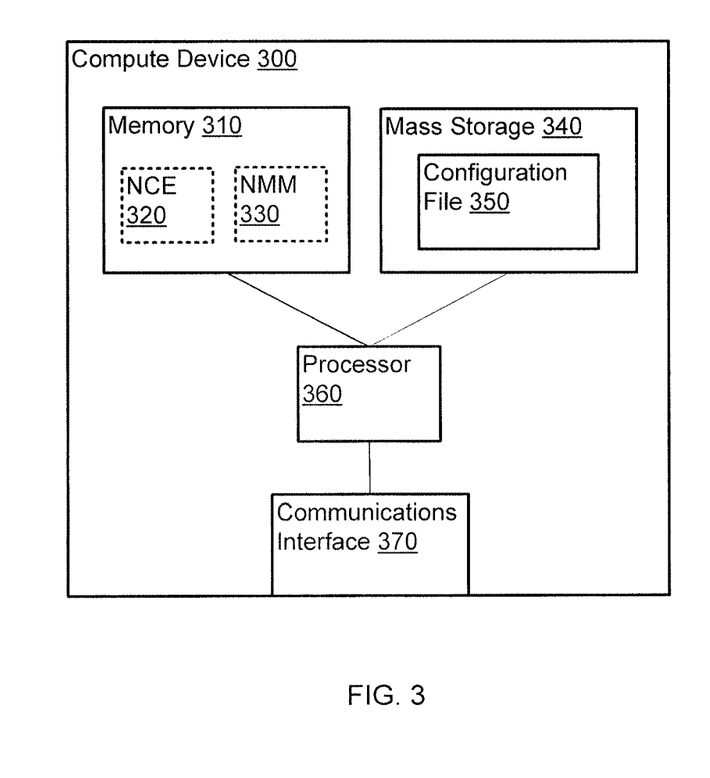
FIG. 3 is a schematic illustration of a network management device of a switch fabric system, according to another embodiment.

FIG. 3 is a system block diagram of a compute device 300 substantially similar to the compute device 150, according to an embodiment. Compute device 300 includes processor 360, memory 310, mass storage 340, and communications interface 370. Processor 360 is operatively coupled to memory 310, mass storage 340, and communications interface 370. Compute device 300 can communicate with other network management devices, peripheral processing devices and/or other network devices via communications interface 330.

As illustrated in FIG. 3, compute device 300 can host a network management module 330 similar to the network management module 155. In other words, network management module 330 can be a process, application, virtual machine, and/or some other software module (executing in hardware) or a hardware module that is executed at network management device 300. In some embodiments, for example, instructions that implement network management module 330 can be stored at memory 310 and executed at processor 360. Compute device can also host a network control entity 320 similar to network control entities 120, 130, 140. In other words, network control entity 320 can be a process, application, virtual machine, and/or some other software module (executing in hardware) or a hardware module that is executed at network management device 300.

In some embodiments, compute device 300 can be dedicated to hosting network management module 330. In other words, compute device 300 can allocate all or substantially all of its computing resources (e.g., processing capacity and memory) to network management module 330. In some embodiments, compute device 300 can host other processes, applications, virtual machines, and/or software modules in addition to network management module 330. For example compute device 300 can be a general purpose compute device or compute node that hosts multiple processes, applications, virtual machines, and/or software modules. In other embodiments, compute device 300 can be dedicated to hosting both network management module 330 and network control entity 320.

As illustrated in FIG. 3, compute device 300 can host configuration file 350 stored at mass storage 340. In some embodiments, mass storage 340 can be a persistent, machine-readable data storage such as a hard disk drive, solid state drive, and the like. In other embodiments, mass storage 340 can be volatile memory or nonvolatile memory. In still other embodiments, configuration file 350 can be hosted outside of compute device 300. For example, configuration file 350 can be stored on a dedicated mass storage device, such as an external RAID device, SAN, external drive, and the like.

Figure 4:
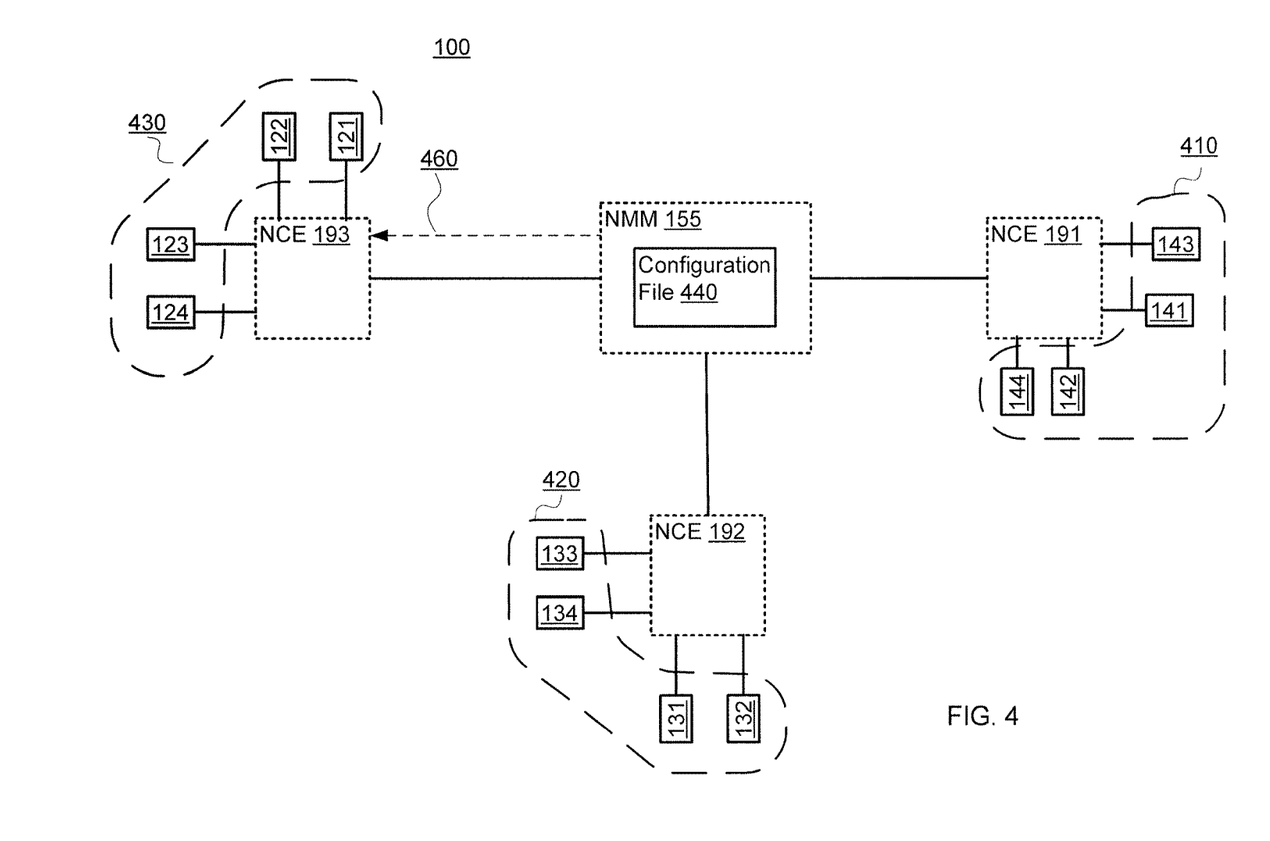
FIGS. 4-5 are schematic illustrations of switch fabric systems, according to other embodiments.

Referring now to FIG. 4, a block diagram of a logical topology of the control plane of the switch fabric system 100 from FIG. 1 is shown. As shown in FIG. 4, in the control plane, the network control entities 191-193 are operatively coupled to network management module 155. As shown in FIG. 1, and as described in further detail herein, such a connection can be through a control plane portion of the communications network 110. Network management module 155 can manage and/or control configuration file 440. FIG. 4 shows configuration file 440 within network management module 155. It should be understood that FIG. 4 merely illustrates that network management module 155, as shown in FIG. 4, manages and/or controls configuration file 440. Configuration file 440 or portions of configuration file 440 can be stored in memory or some other storage device in the same network management device that hosts network management module 155, such as the computer device 150 shown in FIG. 1. In other embodiments, configuration file 440 or portions of configuration file 440 can be stored in some other compute or storage device to which network management module 155 is operatively coupled. In other embodiments, configuration file 440 or portions of configuration file 440 can be stored in a network device, such as network devices 120, 130, 140 shown in FIG. 1. As described above, network management module 155 can use address and identifier information stored in configuration file 440 to direct control plane signals to network control entities 191-193.

FIG. 4 shows that each of network control entities 191-193 manages and/or controls groups of ports 181-183, respectively. Group of ports 410, managed and/or controlled by network control entity 191, is physically located at the same network device at which network control entity 191 is located. Group of ports 420, managed and/or controlled by network control entity 192, is physically located at the same network device at which network control entity 192 is located. Group of ports 430, managed and/or controlled by network control entity 193, is physically located at the same network device at which network control entity 193 is located.

In some embodiments, the network management module 155 can retrieve control plane connectivity data from configuration file 440 using an identifier associated with the network control entity 193. Using the control plane connectivity data, network management module 155 can direct a control plane signal 460 through the control plane of portion of the communications network (not shown) to network control entity 193.

Figure 6:
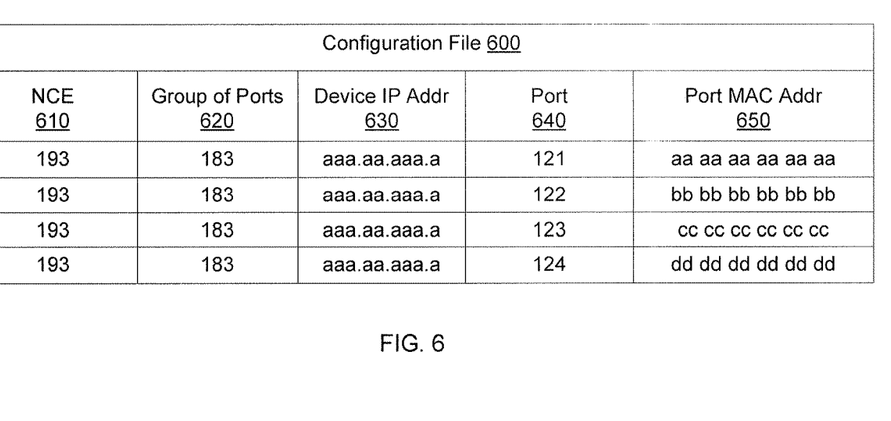
FIGS. 6-7 are illustrations of configuration files, according to some embodiments.

FIG. 6 shows an example of a configuration file 600 that can be similar to configuration file 440 and that can be used by a network management module, such as network management module 155, to relate control plane connectivity data and identifier information for network control entity 193. The example configuration file 600 contains a set of values for a network control entity identifier 610, a group of ports identifier 620, a port identifier 640, a network device IP address 630, and a port MAC address 650. The values in configuration file 600 for device IP address 630 and port MAC address 650 are illustrative of the format of an IP address and MAC address, respectively. Those of skill in the art understand that values for device IP address 630 and port MAC address 650 would be actual IP address and MAC address values, respectively. Network management module 155 can determine the control plane connectivity data for port 121 by using a port identifier and group of ports identifier. Specifically, network management module 155 can determine to send a control plane signal to port 121 at device IP address 630 having a value "aaa.aa.aaa.a" and port MAC address 650 having a value "aa aa aa aa aa aa" based on the group of ports 620 having a value 183 and port identifier 640 having a value 121. In other embodiments, other identifiers or control plane connectivity fields and data can be maintained in configuration file 600.

Figure 5:
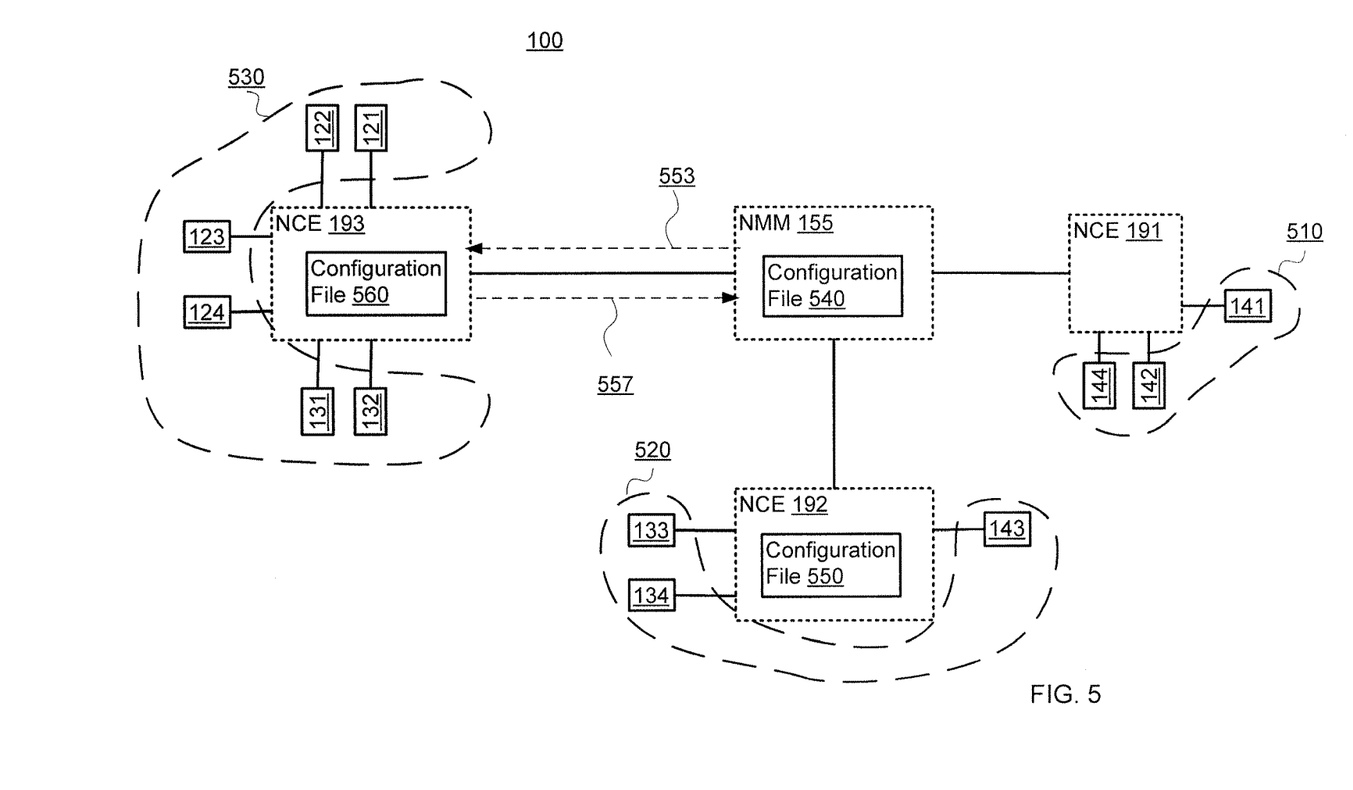

FIG. 5 is a block diagram of a logical topology of the control plane of switch fabric system 100 in another embodiment. In this example, network control entity 191 manages and/or controls group of ports 510 of ports 141, 142, 144. Network control entity 192 manages and/or controls group of ports 520 of ports 133, 134, 143. Network control entity 193 manages and/or controls group of ports 530 of ports 121-124, 131, and 132. As shown in FIG. 5, in some embodiments, a network control entity can maintain a configuration file. For example, network control entity 193 maintains configuration file 560. It should be understood that FIG. 5 merely illustrates that network management module 155 can manage and/or control configuration file 540, network control entity 192 can manage and/or control configuration file 550, and network control entity 193 can manage or control configuration file 560. In such an embodiment, network management module 155 can send a control plane signal 553 requesting network control entity 193 to respond with control plane connectivity data for a network device or port managed and/or controlled by network control entity 193. Such a signal can include identifier information for the network device or port for which a network control entity is to retrieve control plane connectivity data. Network control entity 193 can retrieve control plane connectivity data from configuration file 560 in a way similar to that as described in FIG. 4. Network control entity 193 can send a control plane signal 557 with the control plane connectivity data to network management module 155. Network control entity 193 can then use the control plane connectivity data to send control plane signals to the network device or port identified by the control plane connectivity data.

Likewise, network control entities 191-193 can request control plane connectivity data from other configuration files maintained by other network control entities. For example, network control entity 192 can send a control plane signal to network control entity 193 in a way similar to that as described above to receive control plane connectivity data maintained by network control entity 193.

FIG. 5. further illustrates that a network control entity can maintain a configuration file that contains control plane connectivity data for a network device or port that is located at a network device other than the network device at which the network control entity is located. For example, network control entity 193, located at network device 120, can maintain configuration file 560, which contains control plane connectivity data for ports 131 and 132, located at network device 130 (not shown).

Figure 7:
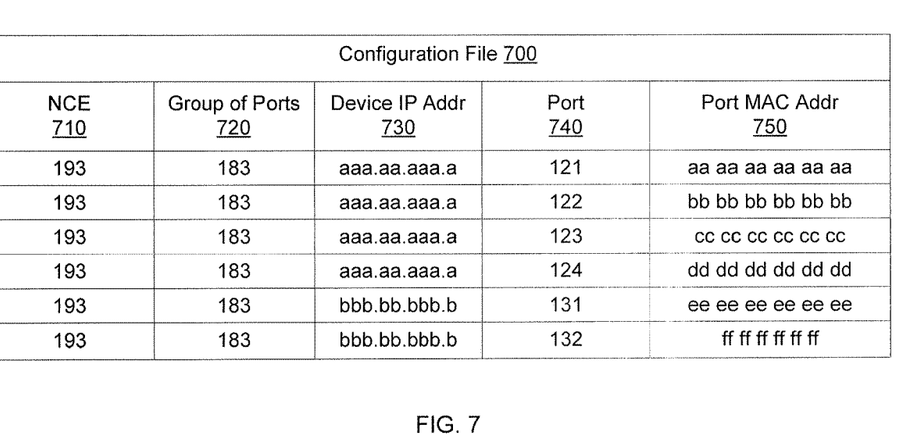

FIG. 7 shows an example of a configuration file 700 that can be used by a network control entity to relate control plane connectivity data and identifier information for network devices and/or ports managed and/or controlled by that network control entity. The example configuration file 700 contains a set of values for network control entity identifier 710, a group of ports identifier 720, a network device IP address 730, a port identifier 740, and a port MAC address 750. Those of skill in the art understand that values for device IP address 720 and port MAC address 750 would be actual IP address and MAC address values, respectively.

Network management module 155 can determine the control plane connectivity data for port 121 by using a port identifier and group of ports identifier. Specifically, network management module 155 can determine to send a control plane signal to port 740 having a value of 121 at device IP address 730 having a value "aaa.aa.aaa.a" and port MAC address 750 having a value "aa aa aa aa aa aa" based on group of port identifier 720 having a value 183 and port identifier 740 having a value 121. In other embodiments, other identifiers or control plane connectivity can be maintained in configuration file 700.

Figure 8:
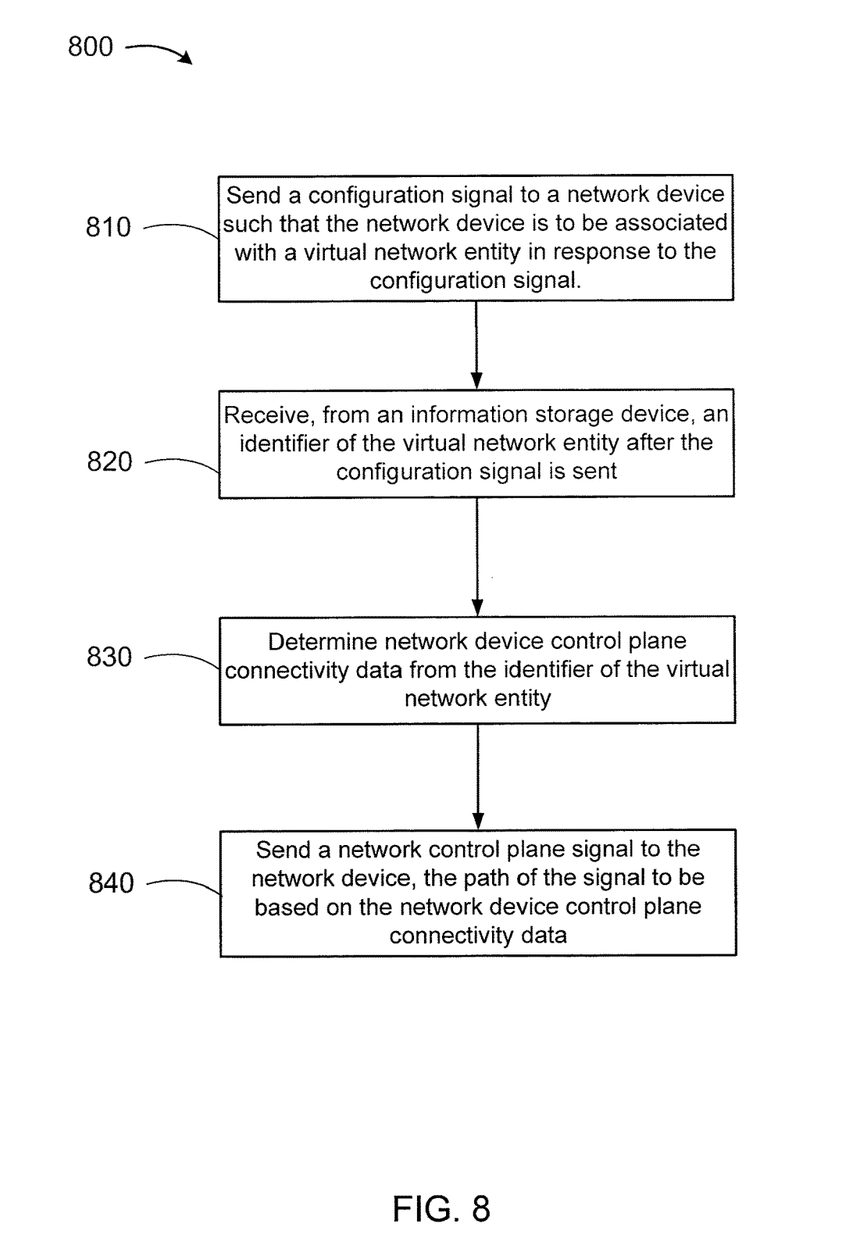
FIG. 8. is a flow chart illustrating a method of deriving network control plane connectivity data, according to an embodiment.

FIG. 8 is a flow chart illustrating a method 800 of deriving network control plane connectivity of a distributed control plane, according to another embodiment. The method 800 includes sending a configuration signal to a network device, at 810. The configuration signal causes the network device to be associated with a virtual network entity in response. The virtual network entity can be a logical group of ports and/or network devices within a virtual network switch fabric. Accordingly, as discussed above, the associating the network device can define a logical relationship between the network control plane connectivity data associated with the network device (e.g., IP address) and an identifier of the virtual network entity (e.g., identifier of a network control entity).

An identifier of the virtual network entity is received from an information storage device, at 820. The information storage device can be a configuration file, as discussed above, or a writable hardware memory device. The identifier can be a network control entity identifier, a group of ports identifier, or some other data that uniquely identifies the virtual network entity and/or the membership of network devices and/or ports associated with the virtual network entity.

The network control plane connectivity data is determined based on the identifier of the virtual network entity, at 830. As discussed above, a network management module can access a configuration file and retrieve network control plane connectivity data related, in the configuration file, to the identifier of the network management module. Likewise, a network control entity can also access a configuration file in the same way.

A network control plane signal can be sent to a network device, at 840. A network management module can direct the network control plane signal to the network device using the control plane connectivity data determined at 830. Similarly, a network control entity can direct a network control plane signal in the same way.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

Embodiments shown and described above refer to multiple peripheral processing devices, including compute notes, storage nodes, service nodes and routers. In some embodiments, one or more of the compute nodes can be general-purpose computational engines that can include, for example, processors, memory, and/or one or more network interface devices (e.g., a network interface card (NIC)). In some embodiments, the processors within a compute node can be part of one or more cache coherent domains. In some embodiments, the compute nodes can be host devices, servers, and/or so forth. In some embodiments, one or more of the compute nodes can have virtualized resources such that any compute node (or a portion thereof) can be substituted for any other compute node (or a portion thereof) operatively coupled to a switch fabric system.

In some embodiments, one or more of the storage nodes can be devices that include, for example, processors, memory, locally-attached disk storage, and/or one or more network interface devices. In some embodiments, the storage nodes can have specialized modules (e.g., hardware modules and/or software modules) to enable, for example, one or more of the compute nodes to read data from and/or write data to one or more of the storage nodes via a switch fabric. In some embodiments, one or more of the storage nodes can have virtualized resources so that any storage node (or a portion thereof) can be substituted for any other storage node (or a portion thereof) operatively coupled to a switch fabric system.

In some embodiments, one or more of the services nodes can be an open systems interconnection (OSI) layer-4 through layer-7 device that can include, for example, processors (e.g., network processors), memory, and/or one or more network interface devices (e.g., 10 Gb Ethernet devices). In some embodiments, the services nodes can include hardware and/or software to perform computations on relatively heavy network workloads. In some embodiments, the services nodes can perform computations on a per packet basis in a relatively efficient fashion (e.g., more efficiently than can be performed at, for example, a compute node 110). The computations can include, for example, stateful firewall computations, intrusion detection and prevention (IDP) computations, extensible markup language (XML) acceleration computations, transmission control protocol (TCP) termination computations, and/or application-level load-balancing computations. In some embodiments, one or more of the services nodes can have virtualized resources so that any service node (or a portion thereof) can be substituted for any other service node (or a portion thereof) operatively coupled to a switch fabric system.

In some embodiments, one or more of the routers can be networking devices operable to connect at least a portion of a switch fabric system (e.g., a data center) to another network (e.g., the global Internet). In some embodiments, for example, a router can enable communication between components (e.g., peripheral processing devices, portions of the switch fabric) associated with a switch fabric system. The communication can be defined based on, for example, a layer-3 routing protocol. In some embodiments, one or more of the routers can have one or more network interface devices (e.g., 10 Gb Ethernet devices) through which the routers can send signals to and/or receive signals from, for example, a switch fabric and/or other peripheral processing devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components, and/or features of the different embodiments described. For example, some embodiments of a switch fabric system (e.g., FIG. 1) include a route reflector while others do not.

What is claimed is:

1. A system, comprising:

a compute device configured to send a configuration signal through a network control plane to a first network device such that the first network device is associated with a first portion of a virtual network entity hosted at the first network device and a second portion of the virtual network entity hosted at a second network device, the virtual network entity having a virtual network entity identifier, a plurality of ports of the first network device being provisioned to the first portion of the virtual network entity, a plurality of ports of the second network device being provisioned to the second portion of the virtual network entity, the first network device associated with network control plane connectivity data that defines a relationship between the virtual network entity identifier and the first network device, the compute device configured to determine the network control plane connectivity data associated with the first network device based on the virtual network entity identifier, the compute device configured to send a control plane signal to the first network device using a path determined based on the network control plane connectivity data associated with the first network device.

2. The system of claim 1, wherein the network control plane connectivity data associated with the first network device has an Internet Protocol (IP) address and a Media Access Control (MAC) address associated with the first network device.

3. The system of claim 2, wherein the MAC address associated with the first network device is a MAC address associated with at least one port from the plurality of ports of the first network device.

4. The system of claim 1, wherein the virtual network entity is a first virtual network entity, the first virtual network entity is different from a second virtual network entity hosted at the first network device and associated with a second virtual network entity identifier.

5. The system of claim 1, wherein
the compute device maintains, at the compute device, the network control plane connectivity data of the first network device and the virtual network entity identifier.

6. The system of claim 1, wherein
the compute device is configured to send a network control plane request signal to the first network device to request the network control plane connectivity data associated with the first network device and the virtual network entity identifier associated with the virtual network entity;
the compute device is configured to receive the network control plane connectivity data associated with the first network device and the virtual network entity identifier associated with the virtual network entity in response to the network control plane request signal.

7. A system, comprising:
a compute device;
a first network device to host a first portion of a virtual network entity, the first network device being associated with a first network control plane connectivity data that defines a relationship between the first network device and a virtual network entity identifier of the virtual network entity, a plurality of ports of the first network device being provisioned to the first portion of the virtual network entity, the compute device to determine the first network control plane connectivity data based on the virtual network entity identifier;
a second network device to host a second portion of the virtual network entity a plurality of ports of the second network device being provisioned to the second portion of the virtual network entity, the second network device being associated with a second network control plane connectivity data defining a relationship between the second network device and the virtual network entity identifier; and
the first network device being operatively coupled to the compute device through a network control plane, the second network device being operatively coupled to the compute device through the network control plane, the compute device configured to send a control plane signal to the first network device through the network control plane based on a path determined from the first network control plane connectivity data.

8. The system of claim 7, wherein:
the compute device is configured to maintain, at the first network device, the second network control plane connectivity data associated with the second network device and the virtual network entity identifier,
the compute device is configured to determine the second network control plane connectivity data associated with the second network device from the virtual network entity identifier.

9. The system of claim 7, wherein
the control plane signal is a second control plane signal;
the first network device is configured to maintain the first network control plane connectivity data associated with the first network device, the second network control plane connectivity data associated with the second network device, and the virtual network entity identifier;
the first network device is configured to determine the first network control plane connectivity data associated with the first network device from the virtual network entity identifier based on the maintained first network control plane connectivity data;
the first network device is configured to send a first control plane signal to the compute device, the first control plane signal includes the first network control plane connectivity data associated with the first network device.

10. The system of claim 7, wherein
the control plane signal is a second control plane signal;
the first network device is configured to maintain the first network control plane connectivity data associated with the first network device, a portion of the second network control plane connectivity data associated with the second network device, and the virtual network entity identifier;
the first network device is configured to determine the second network control plane connectivity data associated with the second network device from the virtual network entity identifier based on the maintained second network control plane connectivity data;
the first network device is configured to send a first control plane signal to the compute device, the first control plane signal includes the second network control plane connectivity data associated with the second network device.

11. The system of claim 7, wherein
the control plane signal is a second control plane signal;
the first network device is configured to maintain the first network control plane connectivity data associated with the first network device and the virtual network entity identifier,
the second network device is configured to maintain the second network control plane connectivity data associated with the second network device and the virtual network entity identifier,
the first network device is configured to determine the first network control plane connectivity data associated with the first network device from the virtual network entity identifier based on the maintained first network control plane connectivity data,
the first network device is configured to send a first control plane signal to the compute device, the first control plane signal includes the first network control plane connectivity data associated with the first network device.

12. The system of claim 7, wherein
the first network control plane connectivity data of the first network device includes an Internet Protocol (IP) address and a Media Access Control (MAC) address of the first network device and the second network control plane connectivity data of the second network device includes an IP address and a MAC address of the second network device.

13. A method, comprising:
sending, from a compute device, a first configuration signal to a first network device such that a plurality of ports of the first network device is associated with a first portion of a virtual network entity hosted at the first network device in response to the first configuration signal;
sending, from the compute device, a second configuration signal to a second network device such that a plurality of ports of the second network device is associated with a second portion of the virtual network entity hosted at the second network device in response to the second configuration signal, the virtual network entity having a virtual network entity identifier;

receiving, from an information storage device, the virtual network entity identifier;

determining, at the compute device, network device control plane connectivity data based on a relationship between the first network device and the virtual network entity identifier, the relationship defined in the network device control plane connectivity data; and sending a network control plane signal to a port from the plurality of ports of the first network device, a path of the network control plane signal is based on the network device control plane connectivity data.

14. The method of claim 13, wherein
the network device control plane connectivity data includes an Internet Protocol (IP) address and a Media Access Control (MAC) address of the first network device.

15. The method of claim 13, wherein
the first network device includes the information storage device.

16. The method of claim 13, wherein the network device control plane connectivity data includes at least one port identifier associated with the port from the plurality of ports of the first network device.

* * * * *